United States Patent
Whitman et al.

(10) Patent No.: US 10,540,385 B2
(45) Date of Patent: Jan. 21, 2020

(54) TASTE PROFILE ATTRIBUTES

(71) Applicant: Spotify AB, Stockholm (SE)

(72) Inventors: Brian Whitman, Cambridge, MA (US); Paul Lamere, Nashua, NH (US)

(73) Assignee: SPOTIFY AB, Stockholm (SE)

( * ) Notice: Subject to any disclaimer, the term of this patent is extended or adjusted under 35 U.S.C. 154(b) by 593 days.

(21) Appl. No.: 14/214,026

(22) Filed: Mar. 14, 2014

(65) Prior Publication Data

US 2014/0279817 A1    Sep. 18, 2014

Related U.S. Application Data

(60) Provisional application No. 61/798,887, filed on Mar. 15, 2013.

(51) Int. Cl.
*G06F 16/435* (2019.01)
*G06F 16/635* (2019.01)

(52) U.S. Cl.
CPC .......... *G06F 16/437* (2019.01); *G06F 16/637* (2019.01)

(58) Field of Classification Search
CPC ......... G06F 17/30743; G06F 17/30766; G06F 17/30699
USPC ........................................................ 707/742
See application file for complete search history.

(56) References Cited

U.S. PATENT DOCUMENTS

| | | | |
|---|---|---|---|
| 6,006,218 A * | 12/1999 | Breese | G06F 16/951 |
| 8,005,724 B2 * | 8/2011 | Dunning | G06F 17/30017 |
| | | | 705/26.7 |
| 2003/0089218 A1 * | 5/2003 | Gang | G06F 17/30743 |
| | | | 84/615 |
| 2004/0172267 A1 | 9/2004 | Patel et al. | 705/1 |
| 2007/0157797 A1 | 7/2007 | Hashizume et al. | 84/609 |
| 2008/0104111 A1 | 5/2008 | Slaney et al. | 707/104.1 |
| 2008/0261516 A1 * | 10/2008 | Robinson | G06F 15/16 |
| | | | 455/3.06 |
| 2009/0083116 A1 * | 3/2009 | Svendsen | G06F 17/30743 |
| | | | 709/217 |
| 2010/0030772 A1 | 2/2010 | Zilca et al. | 707/5 |
| 2010/0070917 A1 * | 3/2010 | Gates | G06F 17/30053 |
| | | | 715/810 |
| 2010/0162115 A1 * | 6/2010 | Ringewald | G06F 17/30743 |
| | | | 715/716 |
| 2010/0205222 A1 * | 8/2010 | Gajdos | G06F 17/30766 |
| | | | 707/803 |

(Continued)

FOREIGN PATENT DOCUMENTS

KR    10-2009-0046343 A    5/2009

OTHER PUBLICATIONS

Int'l Search Report and Written Opinion issued in connection with Int'l Appl'n No. PCT/US2014/029409 dated Jun. 29, 2015 (13 pages).

(Continued)

*Primary Examiner* — Alexander Khong
*Assistant Examiner* — John J Morris
(74) *Attorney, Agent, or Firm* — Merchant & Gould P.C.

(57) ABSTRACT

Methods, systems and computer program products are provided for summarizing user activity associated with media content by accessing a taste profile containing a representation of media content activity corresponding to at least one of a plurality of items, generating at least one statistic corresponding to the media content activity, and generating a taste profile attribute by using the at least one statistic.

21 Claims, 3 Drawing Sheets

(56) References Cited

U.S. PATENT DOCUMENTS

| | | | | |
|---|---|---|---|---|
| 2012/0023403 A1* | 1/2012 | Herberger | ......... | G06F 17/30743 |
| | | | | 715/716 |
| 2012/0179693 A1* | 7/2012 | Knight | .............. | G06F 17/30743 |
| | | | | 707/748 |
| 2013/0262089 A1 | 10/2013 | Whitman et al. | .................. | 704/9 |
| 2013/0262469 A1 | 10/2013 | Whitman | ...................... | 707/741 |
| 2013/0262471 A1 | 10/2013 | Whitman et al. | ............. | 707/742 |
| 2014/0114985 A1* | 4/2014 | Mok | .................. | G06Q 30/0271 |
| | | | | 707/748 |
| 2014/0180971 A1* | 6/2014 | Stefik | ................ | G06F 17/30761 |
| | | | | 706/11 |
| 2014/0195544 A1 | 7/2014 | Whitman | ...................... | 707/744 |
| 2014/0279817 A1* | 9/2014 | Whitman | .......... | G06F 17/30029 |
| | | | | 706/52 |

OTHER PUBLICATIONS

Paul Lamere. The Passion Index. https://musicmachinery.com/2009/06/18/the-passion-index/ (accessed Jun. 3, 2019), posted on Jun. 18, 2009.

Paul Lamere. Artist similarity, familiarity and hotness. http://musicmachinery.com/ 2009/05/25/artist-similarity-familiarity-and-hotness (accessed Jun. 3, 2019), posted on May 25, 2009.

Multimodal Music Processing, Meinard Müller and Masataka Goto and Markus Schedl (Eds.) Apr. 2012.

* cited by examiner

301

| Music Taste Record | | | |
|---|---|---|---|
| TPID | Artist ID | Play# | ... |
| CA1234 | AR1234 | 7 | |

Inverted Indices

AR1234 → [f3x89, f4x96,...]
Sexy → [f2x01, f3x89,...]
Beyonce → [f3x89]

TASTE PROFILE ATTRIBUTES

CROSS-REFERENCE TO RELATED APPLICATION

This application claims priority to U.S. Provisional Application No. 61/798,887, filed Mar. 15, 2013, the contents of which are incorporated herein by reference.

BACKGROUND

I. Field

Example aspects described herein relate generally relate to analyzing media activity, and more particularly to taste profiling.

II. Related Art

Listener music data used to be hard to come by. Forty years ago, for example, a music label like Capitol Records would know how many copies the album Abbey Road sold in the U.S., but the label did not know how many times people actually listened to the album. That data scarcity has given way to a data deluge. iPods and desktop music players, for example, keep careful track of how many times each song, album and artist is played—giving music products and service providers a whole new way to look at artist popularity. Music activity tickers, scrobbling (creating lists of what people play), social music recommendations and shares, playlist creation add even more data to distill. The sheer volume of options to sift through quickly creates significant technical challenges for music product or service providers who wish to understand users' music collections, preferences and music activity and then apply that understanding to a listener's experience. These challenges are not just in the music domain. The same challenges are faced by products and service providers in domains of video, games, books and the like.

BRIEF DESCRIPTION

The example embodiments described herein meet the above-identified needs by providing systems, methods and computer program products for summarizing user activity associated with media content. In one embodiment, a processor is configured to: access a taste profile containing a representation of media content activity corresponding to at least one of a plurality of items; generate at least one statistic corresponding to the media content activity; and generate a taste profile attribute by using the at least one statistic.

In another embodiment, the at least one statistic is generated by calculating, for each of the plurality of items, a probability that each of the plurality of items are known and the taste profile attribute is generated by calculating an average of the at least one statistic across the plurality of items.

In another embodiment, the probability is based on any one of, or a combination of, usage data, a mention of one or more of the plurality of items on a webpage, and an external source of popularity data.

In another embodiment, the at least one statistic is, for each of the plurality of items, a value representing a type of item and the taste profile attribute is a measure of the a stylistic diversity of two or more of the plurality of items that are the same type of item.

In another embodiment, the processor is further operable to: generate a plurality of style maps $S_a$ and generate an inverted overlap matrix based on the plurality of style maps, $$O^{-1}(S_1, S_2 \ldots, S_a),$$

wherein each of the plurality of style maps $S_a$ is based on a value representative of how connected a predetermined taste profile activity is to a corresponding item of the plurality of items.

In another embodiment the taste profile attribute (a) is generated according the equation:

$$a = \frac{\sum F(i) * P(i)_{i=1}^{N}}{\sum P(i)_{j=1}^{N}},$$

where F(i) is a value representing the familiarity of a corresponding one of the plurality of items, and P(i) is a value representative of how connected a corresponding taste profile activity is to the corresponding one the plurality of items, and wherein i and N are integers.

In another embodiment, the processor is further configured to calculate a weighted average of an amount representative of a trending popularity across the named collection of items.

In another embodiment, the statistic is a plurality of scores representative of recency of each of the plurality of items, correspondingly, and the taste profile attribute is generated by calculating an average of the plurality of scores.

In another embodiment, the at least one statistic is based on an age of each of the plurality of items and is a probability that each of the plurality of items is known, and the taste profile attribute is generated by calculating an average of the probability across each of the plurality of items.

BRIEF DESCRIPTION OF THE DRAWINGS

The features and advantages of the example embodiments of the invention presented herein will become more apparent from the detailed description set forth below when taken in conjunction with the following drawings.

FIG. 3 illustrates a representative view of a taste profile according to an example embodiment.

FIG. 4 depicts a representative view of inverted indices for terms associated with musical data according to an example embodiment.

DETAILED DESCRIPTION

The example embodiments of the invention presented herein are directed to systems, methods and computer program products for generating and using taste profile attributes, which are now described herein in terms of an exemplary user taste profile in the domain of music. This description is not intended to limit the application of the example embodiments presented herein. In fact, after reading the following description, it will be apparent to one skilled in the relevant art(s) how to implement the following example embodiments in alternative embodiments (e.g., in other domains, such as video, games, books, and the like).

A taste profile (also referred to as a "catalog") is a named collection of media content items. In one example embodiment, a taste profile can be used as input to application programming interface (API) calls. Taste profiles can be configured to interact with software components by other conventional means as well.

A taste profile can be associated with a user and used to maintain an in-depth understanding of the music activity and preference of that user, enabling personalized recommendations, taste profiling and a wide range of social music applications. Libraries and wrappers can be accessed to create taste profiles from a media library of the user, social website activity and other specialized databases to mine music preferences. One mechanism for associating taste profiles with metadata is described in U.S. patent application Ser. No. 13/851,311, filed Mar. 27, 2013, entitled "REAL TIME MAPPING OF USER MODELS TO AN INVERTED DATA INDEX FOR RETRIEVAL, FILTERING AND RECOMMENDATION", which is hereby incorporated by reference in its entirety.

Figure 1:
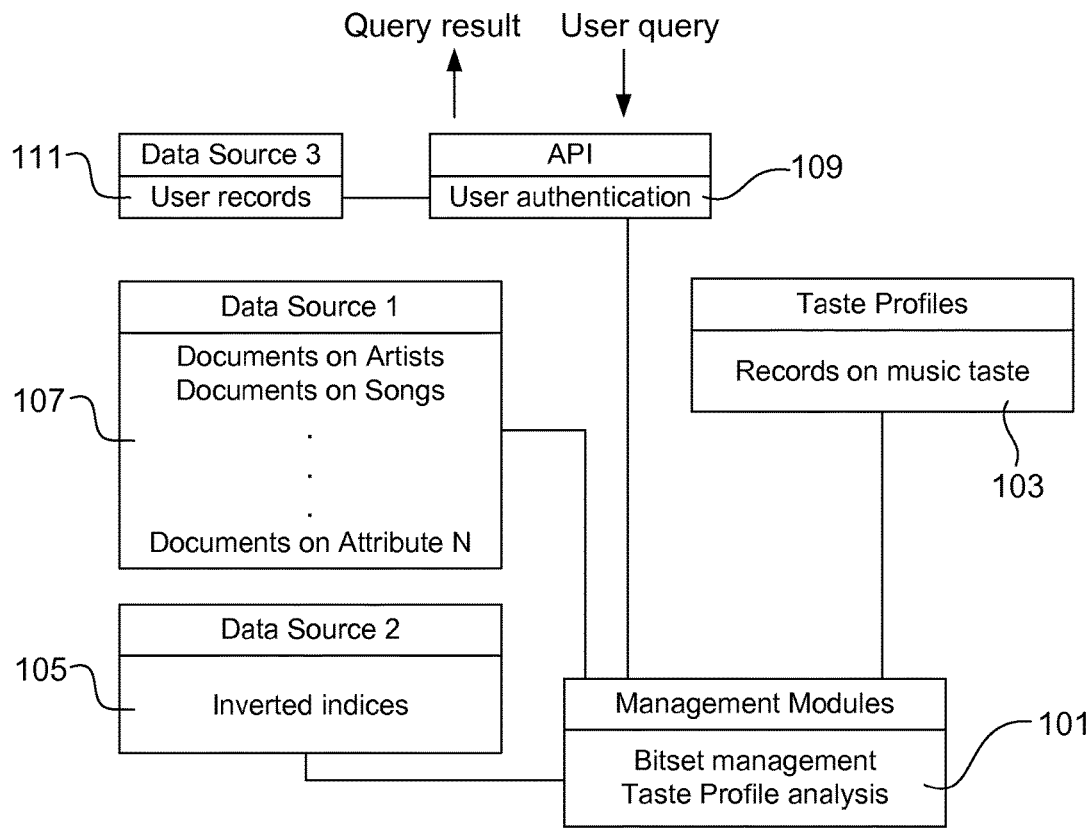
FIG. 1 is a representative view of a system in which some embodiments of the invention may be implemented.

FIG. 1 illustrates a representative view of a system in which some embodiments of the invention may be implemented. The environment comprises several modules, which may be embodied as, for example, computer hardware elements executing software, as described below with respect to FIG. 5.

As shown in FIG. 1, the system includes management modules 101, which control processing including taste profile analysis.

Taste profiles 103 contains records indicating the music taste (or other tastes) of users. In one example embodiment, each taste profile is a representation of musical activity, and may include a wide range of information such as artist plays, song plays, skips, dates of listen by the user, songs per day, playlists, play counts, start/stop/skip data for portions of a song or album, contents of collections, user rankings, preferences, or other mentions received via a client device, or other media plays, such as websites visited, book titles, movies watched, playing activity during a movie or other presentations, ratings, or terms corresponding to the media, such as "comedy", "sexy", etc. An exemplary taste profiles 103 data store is the open source relational database management system (RDBMS) that runs as a server providing multi-user access to a number of databases named MySQL. Further details of the taste profile are described below with respect to FIG. 3.

Data source 105 contains records as inverted indices in which terms are indexes to documents for artist names or song titles. For example, the terms "Sexy", "R&B", and "Dance" might index to a document for artist "Beyonce", as described more fully below with respect to FIG. 4. An exemplary platform for storing such inverted indices is the open source enterprise search platform from the Apache project named Solr.

Data source 107 is a data set which contains (1) documents over various domains, such as artists and titles, and (2) terms and weights associated with each artist and/or each title. Such data is also referred to as metadata (i.e., data about data).

Figure 2:
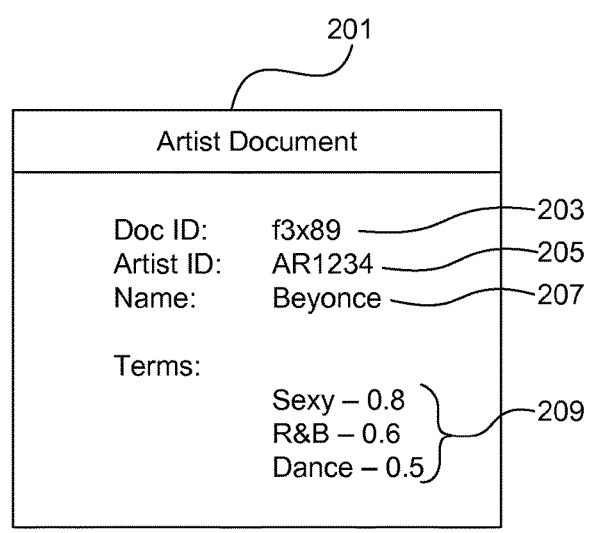
FIG. 2 illustrates a representative view of a set of musical data for an artist according to an example embodiment.

FIG. 2 illustrates an example document 201 according to such a data set. Document 201 contains a document ID 203 which uniquely identifies the document. In one embodiment, the domain concerns musical artists. In accordance with such a domain, document 201 contains an artist ID 205, an artist name 207, and a list of descriptions 209 related to a subject of the domain under consideration, in this case the artist. Each description is a term-weight pair, where the term describes the subject and the weight indicates how closely the term describes the subject. Data source 107 may store a wide range of terms associated with each artist name or song title, and may be updated at regular intervals, e.g., once per week or month.

For example, one example embodiment might include a data set including over 10,000 terms for each artist from various sources of data about music (or other media such as books, movies or games), along with associated weights. The terms may be weighted based on how important, how often mentioned or how closely related the term is to the artist. The terms may contain information about location, genre, style, marketing classifications, sales predictions, reviews, chat room dialogue transcriptions, biographies, recent news articles, time-dependent popularity and familiarity data, cultural analysis data, and the like. For example, the artist "Beyonce" might be associated with a vector of terms including "sexy", "R&B", "dance", etc., with corresponding weights of 0.8, 0.6 and 0.5. In another example, "Aphex Twin" might be represented not by a single entity, but rather by a vector of terms with probabilities, e.g., ["idm":0.9, "glitch":0.5, "hardcore":0.2], etc. Additional information regarding generation of terms and weights can be found in U.S. Pat. No. 7,772,478, entitled "Understanding Music", the contents of which are incorporated by reference herein.

API 109 is an application programming interface (API) used to communicate with a client device to receive or transmit information. In addition, API 109 may present a user interface to a client device or interact with a client device to receive input and display output.

User database 111 contains records having identification information of users. In this example, "user" may correspond to a customer such as a digital music, video or book service who submits a query on behalf of one or more of its customers. The particular request may come via a client device or a remote server of the content provider. "User" may correspond to a person or group whose musical tastes are being examined, as described more fully below. In either case, a user may or may not be required to register and/or input other data to the database. API keys may also be used to authenticate users. For example when an API call is made, an API key is passed to API 109 to authenticate the client device. Only the API key that calls the taste profile API can be used to receive the taste profile identifiers or information associated with the API key. For example, the API call may include an API key parameter that is used to identify the requestor (e.g., a developer or service provider). Only results associated with TPIDs associated with that requestor will be communicated (e.g., customers of the developer or service provider).

The embodiments described herein allow taste profiles to be used to determine an individual's taste(s), for example for the purpose of making recommendations or playlists based on the individual's taste(s).

FIG. 3 illustrates an entry in taste profiles 103, which contains records indicating user musical (or other) tastes. In one example embodiment, a taste profile is a representation of musical activity, and includes a wide range of information such as artist plays, song plays, skips, ratings by the user, date of listen by the user, songs per day, playlists, play counts, start/stop/skip data for portions of a song or album, contents of collections, user rankings, preferences, or mentions, etc. Thus, the taste profile data includes, in addition to an artist name or a song title, one or more of the following: length of listening activity for a song, length of listening activity for an album, and user actions during song or album play, such as fast forwarding, track skipping, stopping or pausing the song, or other media plays, such as websites visited, book titles, movies watched, playing activity during a movie or other presentations, ratings, or terms corresponding to the media, such as "comedy", "sexy", etc.

A taste profile can represent a single user or multiple users. Conversely, a single user or entity can have multiple taste profiles. For example, one taste profile could be generated in connection with a user's song play activity, whereas another separate taste profile could be generated for the same user based on the user's selection of songs/artists for a playlist.

In addition, taste profile data can also contain third party data about users (anonymous or otherwise) via the use of key-value information such as non-activity-related information (e.g., gender, age, and the like). Such information can be obtained, for example, from a service.

Social media sites can be examined to create anonymous users and anonymous taste profiles based on mentions of a song title or an artist. In another example, a third-party audio streaming service can update taste profiles based on song "events", such as streaming of a new song.

Accordingly, it should be understood that taste profiles need not be associated with particular end users and can instead be used for more general queries. Services may also generate their own taste profiles and filter those taste profiles. A radio station recommender, for example, can use one or more taste profiles to obtain similar results. In this example, the radio station recommender generates a taste profile associated with a radio station in general that is not necessarily associated with any particular listener(s) (referred to as a "radio station profile"). This can be accomplished for example, by generating a taste profile with a key/value store, and using this information to filter results. A 'type' key can be added to one or more taste profiles, to indicate whether the taste profile represents a listener, playlist, or the radio station.

An artist name or song title in a taste profile may be resolved from multiple different textual representations in a taste profile. For example, an artist or song might be commonly represented by multiple nicknames, abbreviations, formats, misspellings, aliases, and the like. Accordingly, the system may take raw text which might include these abnormalities and resolve them to a formal artist or song title. Such resolution could be performed in a server performing other aspects of the invention, or could be performed off-site in another device.

In addition, priority or preference values for a particular song or artist can be stored in the taste profile and can be weighted more heavily if, for example, an artists or song is listened to more frequently, or if a user has identified favorite artists or songs.

While the disclosure refers mainly to using musical data such as artist name or song title for purposes of clarity, it should be understood that the disclosure is not limited thereto. In particular, another media preference (e.g., book, movie or game preference) can be used instead of, or in combination with, musical data. For example, number of views or reads, mentions from social media networks, user settings, playlists or favorites lists can be obtained by crawling or mining this information from the web or other user data to determine preferences related to types of content other than music, for example, book, movie or game titles. Thus, according to the invention, the data set and corresponding terms and weights can be one of a musical data set, a book data set, a movie data set, a game data set, or some combination thereof.

In one example, the taste profile database 103 is updated continuously. For example, a record is added when a user listens to a new song, and the record is updated when an update of the user preference for the song is received via a client device. In one embodiment, the information received from the client device is stored in the database, the correct "matched" metadata is added, and a play count is initialized. For example, a taste profile update with "Britney Spears—Oops" gets resolved to the actual song ID and metadata for "Britney Spears" and "Oops, I Did It Again", with a play count of 1. If a fingerprint code (e.g., an audio fingerprint code) is sent to initialize a taste profile item, the system can resolve the fingerprint code to metadata and discard the fingerprint code. Taste profiles can also be generated by collecting text from any website which is publicly accessible including Facebook pages, Twitter feeds, Google+ pages, YouTube postings and the like, such as described in U.S. patent application Ser. No. 13/850,044, filed Mar. 25, 2013, entitled "NAMED ENTITY EXTRACTION FROM A BLOCK OF TEXT", which is hereby incorporated by reference in its entirety.

Referring back to FIG. 1, taste profiles 103 contain records indicating the music taste (or other tastes) of users. Each taste profile is a representation of musical activity, and may include a wide range of information. Taste profiles 103 can be implemented as one or more relational databases or in any other way that allows fast query processing and scaling.

Returning to FIG. 3, a record 301 in taste profiles 103 contains a taste profile ID 303 corresponding to a user. The record 301 may further contain various fields identifying a song, such as an artist ID 305 identifying the performer of the song, a play count 307, and an album number or track number identifying the medium of the song (not shown). In addition, the record 301 may contain various fields indicating a user's affinity for the song, such as a play count 307 and a review.

Each record 301 in the taste profile is used to produce, for each taste profile ID 303, a list of terms, where the length of the list generally ranges between 1 and 100,000. Each record 301 can be implemented as a covering index residing in RAM for fast random access by management modules 101.

Functionally, the API 109 takes a request from a client device, and authenticates users included in the request against the user database 111. Upon successful authentication, the request is passed to the management module 101. After the management module 101 performs processing to fulfill the request and sends the processing result back to the network, the API 109 outputs the processing result to the client device.

Other databases (not shown) may be communicatively linked to management modules 101. Such additional databases may store music requests each corresponding to one or more users, each representing a list of documents over a specific domain that is associated with specific users. Still other databases may contain records mapping a user to the list of records in the taste profile database 103.

In one embodiment, a management module 101 analyzes taste profiles and generates taste profile attributes. Taste profile attributes are a set of scores and summaries that provide a better understanding of each music listener (or user) on any service. These attributes can be used to paint a detailed picture of each user and improve the listening experience.

In an exemplary embodiment, computing a taste profile attribute begins with a taste profile having a named collection of media content items in it. Each media content item can be any item or reference—a song, artist, movie, book title, author, director, etc. Each item has a timestamp of when the updating happened, and an action variable defining what action(s) relating to the media content item occurred, such as when it was played, read, viewed, rated, skipped, etc. Other features can be embedded in the media content item as well, for example, based on the type content it is. In one embodiment, each media item is linked to a database containing similar metrics across multiple taste profiles.

Taste profile attributes, in turn, are calculated based on the statistics of a collection. The following are example statistics that are computed:

Familiarity: the probability that a listener in the community would have heard of a media content item such as an artist or song. For example, from a scale of 0.0-1.0, where 0.0 means least familiar and 1 means very familiar, the Beatles would have a Familiarity of 1. This probability is based on data that includes usage data (e.g., in the domain of music, how many times the media content item was listened to; in the domain of movies, how many times a movie was viewed), mentions on webpages, external sources of popularity data such as charts, ratings or reviews, sales rankings, and the like. In one embodiment, a management module 101 generates a Familiarity value by calculating a normalized measure of this data.

Hotttnesss: the relative amount of trending popularity of the item (e.g., artist or song) at an instant in time. Hotttnesss can be used, for example, as a time varying trend for an artist to know how popular that artist is based on mentions on social media, play deltas over the last day, week. Hotttnesss can be based on much of the same data that is used to determined Familiarity, but focusing more on the current play and activity data to identify what is presently being listened to or discussed on various media.

Affinity: a value representative of how connected particular taste profile activity is to a media content item (e.g., an artist, song, book, director, author, movie title, and the like). A high rating or high play count, for example, leads to a high Affinity. In one example embodiment, Affinity is computed by using a normalized weighting of the play counts (or ratings) across all the plays of the media content item in a taste profile.

Terms: words that describe an artist or song that are filtered into genre, style terms, or description. Terms may also have probabilities associated with them. For example, a descriptive term, such as "Sexy", can have a probability associated with it such that someone will describe a particular media item as having that particular descriptive term.

In one example implementation, media content item data from a taste profile is loaded into a memory. This memory can be used to retrieve the last N items (e.g., where N is an integer) that have been updated in the taste profiles. This allows, for example, faster processing speeds because computing operations are performed on less data. It also allows for recency. That is, it allows the most recent attributes to be computed based on the most recent taste profile updates and summarizations of the most recent activity.

Taste profile attributes are a set of scores and summaries that provide a better understanding of a listener. Example taste profile attributes based on the above-described statistics are now described in more detail.

Mainstreamness: a measure of the overall familiarity of a user's listening activity to determine preference for either mainstream or more obscure music. A listener may take pride in finding the deepest, most obscure cuts, or prefer to keep up to date with the Top 40. A user Mainstreamness score captures this distinction and can be used to determine how popular a user's tastes are. Particularly, Mainstreamness is computed by averaging the Familiarity of each item in a taste profile. In another example embodiment, the Mainstreamness attribute is used to find listeners who spend most of their time listening to a particular type media content, such as deep tracks, which encompass lesser-known album tracks, one-hit wonders, concert recordings, and the like.

Diversity: a measure of the overall diversity of a listener's listening history by mapping a distance across the musical styles enjoyed by the listener. More particularly, Diversity is a measure of how stylistically diverse a type of media content item (e.g., artists) in a taste profile is. Two pieces of data are used to calculate Diversity: a map referred to as a style map, $S_a$, which is a map of style to an item (e.g., based on the affinity of an item), and an overlap matrix, O ($S_1, S_2, \ldots, S_a$), which is a diagonal square matrix that measures overlap (or similarity) of styles applied to artists.

To generate a style map, all the Affinity values for a particular style are added up. Diversity is then computed across all the style maps using an inverted version of the O matrix, such that, for each S, $$\text{Diversity} = O^{-1}(S_1, S_2, \ldots, S_a). \quad (1)$$

For example, "rap" and "hip-hop" often co-occur to the same artists. In this example, the $O^{-1}$ (rap, hip-hop) is higher than $O^{-1}$ (rap, folk).

Passion: a number representative of how passionate a listener is about particular media content in their collections based on, for example, artists, authors, actors, and the like. In one embodiment, a Passion value for a particular media item can be weighted based on its familiarity, such that even though the item is not generally familiar to most listeners, a high Passion value can be associated with the item. In the music domain, for example, an item of a less popular artist can be weighted more heavily than a media item of a more popular artist. This allows for a higher Passion value to be attributed to an item of a less popular artist. This means that to obtain a higher Passion value for more familiar artists, the user would have to listen to songs of that more familiar artist more times.

In one embodiment, each of the items is scanned to determine an Affinity mapping $M_a$ (e.g., a total play count for each artist, or reads of a book for each author, views of a movie having a particular actor, etc.). Familiarity for each item, F(a), is obtained. Next, for each "a" in the mapping M(a), if the Familiarity is greater than 0, a Passion index map per artist $P_a$ is assigned according to the following equation:

$$P_a = \frac{M_a}{F(a) * S} \quad (2)$$

where S is a scale factor used for normalization (e.g., an integer such as 1000). Both $P_a$ and the mean Passion are calculated over all media items (e.g., based on artists, authors, actors, and the like). For example, a user having a taste profile of several songs, and the user listened to 100 songs in of artist X and 10 songs of having artist Y, a mapping of passion per artists can be generated based on the user's song history. Passion, in this example, is defined as how many times the user has listened to the each artist divided by the Familiarity of that artist multiplied by a constant.

Adventurousness: a measure of a listener's openness to music outside their comfort zone by capturing how adventurous a person's collection is. Familiarity of each item is computed and multiplied by the Affinity of each item. In one exemplary implementation, a running total of plays, reads or views across all items in a profile is maintained.

Adventurousness is computed according to the following equation:

$$a = \frac{\sum F(i) * P(i)_{i-1}^{N}}{\sum P(i)_{j=1}^{N}} \quad (3)$$

where F(i) is the familiarity of an item (i), and P(i) is the Affinity value (e.g., play count) of an item (i).

As explained above, in an exemplary domain of music, Affinity can be based on a play count of the item. Thus, a running total of plays across all items in the profile is maintained. For example, if the well-known band Beatles has a Familiarity of 1, the artist Beyoncé has a familiarity of 0.9, and a lesser-known group called the Dave Rodgers Band has a Familiarity of 0.1, and a listener has listened to the Beatles 10 times, Beyoncé 5 times and the Dave Rodgers Band 20 times, then adventurousness is (1*10)+(5*0.9)+(20*0.1)/(10+5+20)=0.4714. In this example, the lower the result, the higher the Adventurousness. In an alternative embodiment, the result can be subtracted by 1 such that the higher the result, the higher the adventurousness.

In an exemplary implementation, Adventurousness can be used to fine-tune a playlist. For example, if greater Adventurousness is desired, the playlist generator can be adjusted to mix in unfamiliar artists and deep tracks from familiar artists. Alternatively, non-adventurous listeners can be kept in a 'safe-listening zone' surrounded by music they know and love by keeping Adventurousness relatively lower.

Hotttnesss: a weighted average of Hotttnessh statistical values (described above) across all the items in a taste profile. A Hotttnesss score for a particular taste profile is generated by determining the Hotttnesss score for each media item in a taste profile and calculating an average of all the Hotttnesss scores.

Currency: a measure of how recently popular the song is. Particularly, Currency is a measure of media items that are popular that are receiving much of their popularity over the recent past. A media item that is new will be seen as current if it has been recently listed.

A Currency score for a particularly taste profile is generated by determining the Currency score for each media item in a taste profile and computing an average of all the Currency scores.

Discovery: Discovery is a score that is based on the age of the media item, which determines to what extent the media item is can be discoverable. A filter based on an artist's familiarity is also applied to emphasize items that are getting played disproportionately to their familiarity. A media item is weighted more heavily if it is relatively new. The older a media item is, the less discoverable it is because it is weighted less.

A Discovery score for a particular taste profile is generated by determining the Discovery score for each media item in a taste profile and computing an average of all the Discovery scores.

In an exemplary implementation, multiple attributes can be combined. For example, Diversity can be combined with adventurousness to find highly-adventurous music fans with the most diverse music taste and introduce them to new styles of music. In another exemplary embodiment, taste profile attributes can be combined to segment listeners into categories such as: the Top-40 fan (high Mainstreamness, high Currency), the hipster (low Mainstreamness, low Currency), and the musically-stagnant fan (low Mainstreamness, low Currency, low Diversity, and low Adventurousness).

Figure 5:
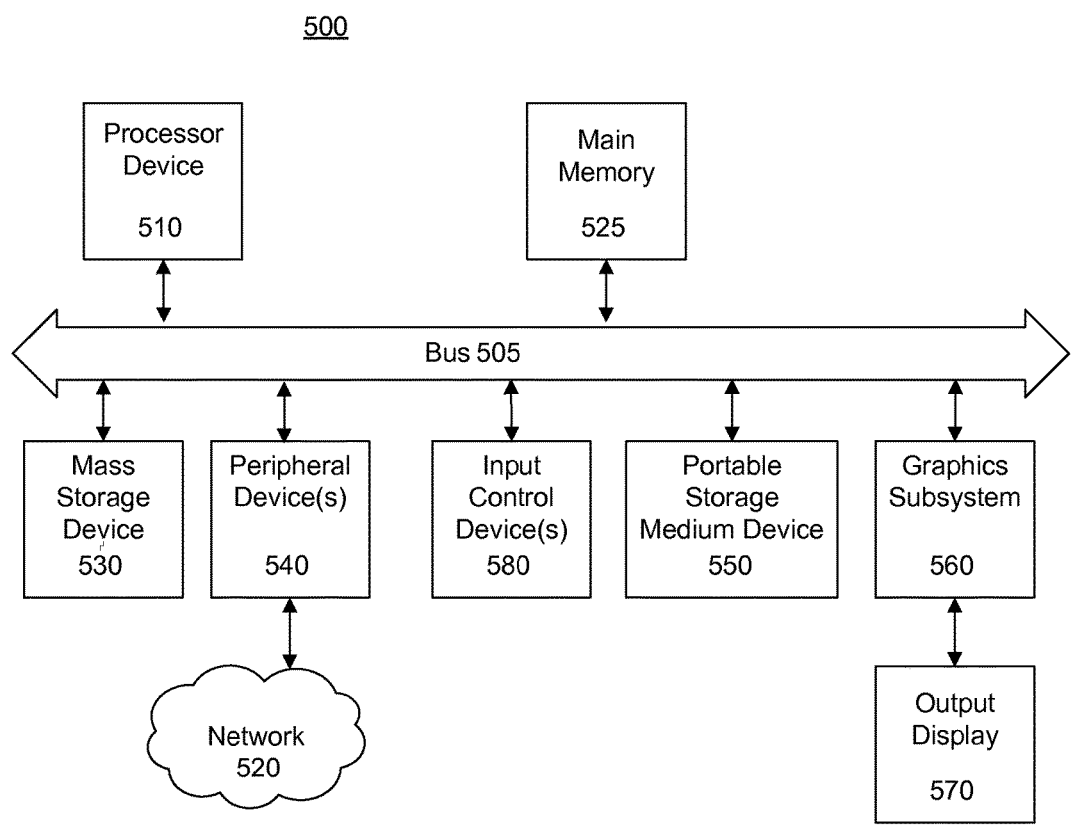
FIG. 5 is a block diagram of a device for use with various example embodiments of the invention.

FIG. 5 is a block diagram of a general and/or special purpose computer 500, which may be a general and/or special purpose computing device, in accordance with some of the example embodiments of the invention. The computer 500 may be, for example, a user device, a user computer, a client computer and/or a server computer, among other things.

The computer 500 may include without limitation a processor device 510, a main memory 525, and an interconnect bus 505. The processor device 510 may include without limitation a single microprocessor, or may include a plurality of microprocessors for configuring the computer 500 as a multi-processor system. The main memory 525 stores, among other things, instructions and/or data for execution by the processor device 510. The main memory 525 may include banks of dynamic random access memory (DRAM), as well as cache memory.

The computer 500 may further include a mass storage device 530, peripheral device(s) 540, portable non-transitory storage medium device(s) 550, input control device(s) 580, a graphics subsystem 560, and/or an output display interface 570. For explanatory purposes, all components in the computer 500 are shown in FIG. 5 as being coupled via the bus 505. However, the computer 500 is not so limited. Devices of the computer 500 may be coupled via one or more data transport means. For example, the processor device 510 and/or the main memory 525 may be coupled via a local microprocessor bus. The mass storage device 530, peripheral device(s) 540, portable storage medium device(s) 550, and/or graphics subsystem 560 may be coupled via one or more input/output (I/O) buses. The mass storage device 530 may be a nonvolatile storage device for storing data and/or instructions for use by the processor device 510. The mass storage device 530 may be implemented, for example, with a magnetic disk drive or an optical disk drive. In a software embodiment, the mass storage device 530 is configured for loading contents of the mass storage device 530 into the main memory 525.

The portable storage medium device 550 operates in conjunction with a nonvolatile portable storage medium, such as, for example, a compact disc read only memory (CD-ROM), to input and output data and code to and from the computer 500. In some embodiments, the software for storing information may be stored on a portable storage medium, and may be inputted into the computer 500 via the portable storage medium device 550. The peripheral device(s) 540 may include any type of computer support device, such as, for example, an input/output (I/O) interface configured to add additional functionality to the computer 500. For example, the peripheral device(s) 540 may include a network interface card for interfacing the computer 500 with a network 520.

The input control device(s) 580 provide a portion of the user interface for a user of the computer 500. The input control device(s) 580 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the computer 500 may include the graphics subsystem 560 and the output display 570. The output display 570 may include a cathode ray tube (CRT) display and/or a liquid crystal display (LCD). The graphics subsystem 560 receives textual and graphical information, and processes the information for output to the output display 570.

Each component of the computer 500 may represent a broad category of a computer component of a general and/or special purpose computer. Components of the computer 500 are not limited to the specific implementations provided here.

Software embodiments of the example embodiments presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine or computer-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further include software for performing example aspects of the invention, as described above.

Included in the programming and/or software of the general and/or special purpose computer or microprocessor are software modules for implementing the procedures described above.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIGS. 1-5 are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A system for summarizing user activity associated with media content, comprising:
   a processor configured to:
   access a taste profile associated with a first user containing a plurality of entries defining a representation of media content activity, each entry being associated to at least one corresponding item of a plurality of items, and at least two of the entries of the plurality of entries being action variables defining actions relating to the at least one corresponding item, a first of the actions being playback of the corresponding item associated with the first user, a second of the actions being playback of the corresponding item associated with a plurality of second users other than the first user;
   retrieve at least one term from a plurality of term-weight pairs contained in a document, the at least one term being (i) indexed to a corresponding entry of the plurality of entries in the taste profile and (ii) weighted by a weight indicating the closeness of the term to the corresponding entry;
   generate statistics corresponding to the media content activity based in part by combining the action variables and one or more of the plurality of term-weight pairs, the statistics including: i) an affinity statistic; and ii) a familiarity statistic, the affinity statistic being, for each of the plurality of items, based at least in part on counting a number of playbacks of the item associated with the first user, and the familiarity statistic being, for each of the plurality of items, based at least n part on calculating a probability that the plurality of second users other than the first user know of the item; and generate taste profile attributes by using at least one of the statistics, the taste profile attributes including: i) a passion attribute; and ii) an adventurousness attribute, the passion attribute being based on the affinity statistic and the familiarity statistic and being generated in part by measuring an amount of passion of the first user for each of the plurality of items, a value of the passion attribute being inversely proportional to a value of the familiarity statistic, and the adventurousness attribute being based on the affinity statistic and the familiarity statistic and being generated in part by measuring an amount of adventurousness of the first user;

wherein generating each of the taste profile attributes includes calculating an average of the corresponding one or more statistics across the plurality of items.

2. The system according to claim 1, wherein the probability is further based on any one of, or a combination of, a mention of one or more of the plurality of items on a webpage, and an external source of popularity data.

3. The system according to claim 1, wherein the processor is further operable to generate a diversity attribute, the diversity attribute being based on the affinity statistic and being generated in part by measuring a stylistic distance between the plurality of items, the processor being further operable to, when generating the diversity attribute:

generate a plurality of style maps $S_a$; and generate an inverted overlap matrix based on the plurality of style maps, $$O^{-1}(S_1, S_2, \ldots, S_a),$$

wherein each of the plurality of style maps $S_a$ is based on a value representative of how connected a predetermined taste profile activity is to a corresponding item of the plurality of items.

4. The system according to claim 1, wherein the adventurousness attribute (a) is generated according to the equation:

$$a = \frac{\sum F(i) * P(i)_{i=1}^{N}}{\sum P(i)_{j=1}^{N}},$$

where $F(i)$ is a value representing the familiarity of a corresponding one of the plurality of items, and $P(i)$ is a value representative of how connected a corresponding taste profile activity is to the corresponding one of the plurality of items, and wherein i and N are integers.

5. The system according to claim 1, wherein the processor is further configured to:

calculate a weighted average of an amount representative of a trending popularity across the named collection of items.

6. The system according to claim 1, wherein the statistics include a recency statistic, the recency statistic being a plurality of scores representative of recency of each of the plurality of items, correspondingly, and wherein the taste profile attributes include an attribute generated by calculating an average of the plurality of scores.

7. The system according to claim 1, wherein at least one of the statistics is based on an age of each of the plurality of items.

8. A non-transitory computer-readable medium having stored thereon one or more sequences of instructions for causing one or more processors to perform:

accessing a taste profile associated with a first user containing a plurality of entries defining a representation of media content activity, each entry being associated to at least one corresponding item of a plurality of items, and at least two of the entries of the plurality of entries being action variables defining actions relating to the at least one corresponding item, a first of the actions being playback of the corresponding item associated with the first user, a second of the actions being playback of the corresponding item associated with a plurality of second users other than the first user;

retrieving at least one term from a plurality of term-weight pairs contained in a document, the at least one term being (i) indexed to a corresponding entry of the plurality of entries in the taste profile and (ii) weighted by a weight indicating the closeness of the term to the corresponding entry;

generating statistics corresponding to the media content activity based in part by combining the action variables and one or more of the plurality of term-weight pairs, the statistics including: i) an affinity statistic; and ii) a familiarity statistic, the affinity statistic being, for each of the plurality of items, based at least in part on counting a number of playbacks of the item associated with the first user, and the familiarity statistic being, for each of the plurality of items, based at least in part on calculating a probability that the plurality of second users other than the first user know of the item; and generating taste profile attributes by using at least one of the statistics, the taste profile attributes including: i) a passion attribute; and ii) an adventurousness attribute, the passion attribute being based on the affinity statistic and the familiarity statistic and being generated in part by measuring an amount of passion of the first user for each of the plurality of items, a value of the passion attribute being inversely proportional to a value of the familiarity statistic, and the adventurousness attribute being based on the affinity statistic and the familiarity statistic and being generated in part by measuring an amount of adventurousness of the first user;

wherein generating each of the taste profile attributes includes calculating an average of the corresponding one or more statistics across the plurality of items.

9. The computer-readable medium of claim 8, wherein the probability is further based on any one of, or a combination of, usage data, a mention of one or more of the plurality of items on a webpage, and an external source of popularity data.

10. The computer-readable medium of claim 8, wherein the one or more processors are further operable to generate a diversity attribute, the diversity attribute being based on the affinity statistic and being generated in part by measuring a stylistic distance between the plurality of items, the one or more processors being further operable to, when generating the diversity attribute:

generate a plurality of style maps $S_a$; and generate an inverted overlap matrix based on the plurality of style maps, $$O^{-1}(S_1, S_2, \ldots, S_a),$$

wherein each of the plurality of style maps $S_a$ is based on a value representative of how connected a predetermined taste profile activity is to a corresponding item of the plurality of items.

11. The computer-readable medium of claim 8, wherein the adventurousness attribute (a) is generated according to the equation:

$$a = \frac{\sum F(i) * P(i)_{i=1}^{N}}{\sum P(i)_{j=1}^{N}},$$

where F(i) is a value representing the familiarity of a corresponding one of the plurality of items, and P(i) is a value representative of how connected a corresponding taste profile activity is to the corresponding one of the plurality of items, and wherein i and N are integers.

12. The computer-readable medium of claim 8, wherein the one or more processors are further configured to:
calculate a weighted average of an amount representative of a trending popularity across the named collection of items.

13. The computer-readable medium of claim 8, wherein the statistics include a recency statistic, the recency statistic being a plurality of scores representative of recency of each of the plurality of items, correspondingly, and wherein the taste profile attributes include an attribute generated by calculating an average of the plurality of scores.

14. The computer-readable medium of claim 8, wherein at least one of the statistics is based on an age of each of the plurality of items.

15. A method for summarizing user activity associated with media content, comprising the steps of:
accessing a taste profile associated with a first user containing a plurality of entries defining a representation of media content activity, each entry being associated to at least one corresponding item of a plurality of items, and at least some of the entries of the plurality of entries being action variables defining actions relating to the at least one corresponding item, a first of the actions being playback of the corresponding item associated with the first user, a second of the actions being playback of the corresponding item associated with a plurality of second users other than the first user;
retrieving at least one term from a plurality of term-weight pairs contained in a document, the at least one term being (i) indexed to a corresponding entry of the plurality of entries in the taste profile and (ii) weighted by a weight indicating the closeness of the term to the corresponding entry;
generating statistics corresponding to the media content activity based in part by combining the action variables and one or more of the plurality of term-weight pairs, the statistics including: i) an affinity statistic; and ii) a familiarity statistic, the affinity statistic being, for each of the plurality of items, based at least in part on counting a number of playbacks of the item associated with the first user, and the familiarity statistic being, for each of the plurality of items, based at least in part on calculating a probability that the plurality of second users other than the first user know of the item; and
generating taste profile attributes by using at least one of the statistics, the taste profile attributes including at least: i) a passion attribute; and ii) an adventurousness attribute, the passion attribute being based on the affinity statistic and the familiarity statistic and being generated in part by measuring an amount of passion of the first user for each of the plurality of items, a value of the passion attribute being inversely proportional to a value of the familiarity statistic, and the adventurousness attribute being based on the affinity statistic and the familiarity statistic and being generated by measuring an amount of adventurousness of the first user;
wherein generating each of the taste profile attributes includes calculating an average of the corresponding one or more statistics across the plurality of items.

16. The method of claim 15, wherein the probability is further based on any one of, or a of, usage data, a mention of one or more of the plurality of items on a webpage, and an external source of popularity data.

17. The method of claim 15, further comprising generating a diversity attribute, the diversity attribute being based on the affinity statistic and being generated in part by measuring a stylistic distance between the plurality of items, the method further including, when generating the diversity attribute:
generating a plurality of style maps $S_a$; and
generating an inverted overlap matrix based on the plurality of style maps, $$O^{-1}(S_1, S_2 \ldots, S_a),$$

wherein each of the plurality of style maps $S_a$ is based on a value representative of how connected a predetermined taste profile activity s to a corresponding item of the plurality of items.

18. The method of claim 15, wherein the adventurousness attribute (a) is generated according to the equation:

$$a = \frac{\sum F(i) * P(i)_{i=1}^{N}}{\sum P(i)_{j=1}^{N}},$$

where F(i) is a value representing the familiarity of a corresponding one of the plurality of items, and P(i) is a value representative of how connected a corresponding taste profile activity is to the corresponding one of the plurality of items, and wherein i and N are integers.

19. The method of claim 15, further comprising:
calculating a weighted average of an amount representative of a trending popularity cross the named collection of items.

20. The method of claim 15, wherein the statistics include a recency statistic, the recency statistic being a plurality of scores representative of recency of each of the plurality of items, correspondingly, and wherein the one or more taste profile attributes include an attribute generated by calculating an average of the plurality of scores.

21. The method of claim 15, wherein at least one of the statistics is based on an age of each of the plurality of items.

* * * * *

UNITED STATES PATENT AND TRADEMARK OFFICE
CERTIFICATE OF CORRECTION

PATENT NO. : 10,540,385 B2
APPLICATION NO. : 14/214026
DATED : January 21, 2020
INVENTOR(S) : Whitman et al.

It is certified that error appears in the above-identified patent and that said Letters Patent is hereby corrected as shown below:

In the Specification

Column 1
Line 61, "the a" should read --the--.
Line 67, "$O^{-1}(S_1, S_2 \ldots , S_a)$," should read --$O^{-1}(S_1, S_2 \ldots , S_a)$,--.

Column 7
Line 30, "determined" should read --determine--.

Column 8
Line 15, "O" should read --$O^{-1}$--.
Line 22, "Diversity=$O^{-1}(S_1, S_2 \ldots , S_a)$," should read --$O^{-1}(S_1, S_2 \ldots , S_a)$,--.
Line 62, "to the" should read --to--.

Column 9
Lines 7-10, "$a = \frac{\sum F(i) * P(i)_{i-1}^{N}}{\sum P(i)_{j=1}^{N}}$" should read --$a = \frac{\sum F(i) * P(i)_{i=1}^{N}}{\sum P(i)_{j=1}^{N}}$--.

In the Claims

Column 12
Line 67, "n" should read --in--.

Column 13
Line 34, "$O^{-1}(S_1, S_2 \ldots , S_a)$," should read --$O^{-1}(S_1, S_2 \ldots , S_a)$,--.

Column 14
Line 62, "$O^{-1}(S_1, S_2 \ldots , S_a)$," should read --$O^{-1}(S_1, S_2 \ldots , S_a)$,--.

Signed and Sealed this
Twenty-second Day of December, 2020

Andrei Iancu
*Director of the United States Patent and Trademark Office*

Column 16
Line 16, "a of," should read --a combination of,--.
Line 30, "$O^{-1}(S_1, S_2 \ldots, S_a)$," should read --$O^{-1}(S_1, S_2 \ldots, S_a)$,--.
Line 33, "s" should read --is--.
Line 51, "cross" should read --across--.